US007365315B2

(12) United States Patent
Berkout et al.

(10) Patent No.: US 7,365,315 B2
(45) **Date of Patent: *Apr. 29, 2008**

(54) METHOD AND APPARATUS FOR IONIZATION VIA INTERACTION WITH METASTABLE SPECIES

(75) Inventors: Vadym D. Berkout, Rockville, MD (US); Vladimir M. Doroshenko, Ellicott City, MD (US)

(73) Assignee: Science & Engineering Services, Inc., Columbia, MD (US)

( * ) Notice: Subject to any disclaimer, the term of this patent is extended or adjusted under 35 U.S.C. 154(b) by 353 days.

This patent is subject to a terminal disclaimer.

(21) Appl. No.: 11/144,666

(22) Filed: Jun. 6, 2005

(65) Prior Publication Data

US 2006/0273254 A1 Dec. 7, 2006

(51) Int. Cl.
*B01D 59/44* (2006.01)
*H01J 49/00* (2006.01)

(52) U.S. Cl. ...................... 250/288; 250/281; 250/282; 250/283; 315/111.91

(58) Field of Classification Search ................ 250/281, 250/282, 283, 288; 315/111.91
See application file for complete search history.

(56) References Cited

U.S. PATENT DOCUMENTS 5,663,561 A 9/1997 Franzen et al.
6,124,675 A 9/2000 Bertrand et al.
6,627,881 B1 * 9/2003 Bertrand et al. ............ 250/288
6,838,663 B2 1/2005 Coon et al.
7,091,477 B2 * 8/2006 Jolliffe et al. ............... 250/282
7,170,051 B2 * 1/2007 Berkout et al. ............. 250/281
2003/0111600 A1 6/2003 Thomson et al.
2005/0001161 A1 * 1/2005 Hiraoka ...................... 250/282
2005/0056775 A1 3/2005 Cody et al.
2006/0273254 A1 12/2006 Berkout et al.

OTHER PUBLICATIONS

Michael Karas, et al, Ionization in Matrix-Assisted Laser Desorption/Ionization: Singly Charged Molecular Ions are The Lucky Survivors, Journal of Mass Spectrometry, vol. 35, 2000, pp. 1-12.
Vladimir Frankevich, et al, The Origin of Electrons in MALDI and Their Use For Sympathetic Cooling of Negative Ions in FTICR, International Journal of Mass Spectrometry, 12221 (2002), pp. 1-9.
Robert B. Cody, et al, Versatile New Ion Source For The Analysis of Materials in Open Air under Ambient Conditions, Anal. Chem. 2005, vol. 77, pp. 2297-2302.
Cris L. Lewis et al, Time-Gated Pulsed Glow Discharge: Real-Time Chemical Speciation at the Elemental, Structural, and Molecular Level for Gas Chromatography Time-of-Flight Mass Spectrometry, Anal. Chem. 2003, vol. 75, pp. 1983-1996.

(Continued)

*Primary Examiner*—Jack Berman
*Assistant Examiner*—Meenakshi S Sahu
(74) *Attorney, Agent, or Firm*—Oblon. Spivak, McClelland, Maier & Neustadt, P.C.

(57) ABSTRACT

An apparatus for analyzing a sample material includes a desorption mechanism configured to desorb molecules from the sample material, a metastable generator separate from the desorption mechanism and configured to generate a metastable species, and an interaction region configured for metastable species ionization of the desorbed molecules so as to produce gas-phase ions of the sample material.

27 Claims, 4 Drawing Sheets

OTHER PUBLICATIONS

Yuri P. Raizer, Gas Discharge Physics, Chapter 13: Capacitively Coupled Radio-Frequency Discharge, pp. 378-414.

U.S. Appl. No. 11/620,504, filed Jan. 5, 2007, Berkout et al.

U.S. Appl. No. 11/126,215, filed May 11, 2005, Berkout et al.

U.S. Appl. No. 11/144,666, filed Jun. 6, 2005, Berkout et al.

* cited by examiner

METHOD AND APPARATUS FOR IONIZATION VIA INTERACTION WITH METASTABLE SPECIES

CROSS REFERENCE TO RELATED APPLICATIONS

This patent application is related to U.S. Provisional Ser. No. 60/572,479, entitled "METHOD OF ION FRAGMENTATION IN A TANDEM MASS SPECTROMETER" filed May 24, 2004, the entire contents of which are incorporated herein by reference. This patent application is related to U.S. Ser. No. 11/126,215 entitled "METHOD OF ION FRAGMENTATION IN A TANDEM MASS SPECTROMETER" filed May 11, 2005, the entire contents of which are incorporated herein by reference.

DISCUSSION OF THE BACKGROUND

1. Field of the Invention

The invention relates to procedures and devices for producing ions from a sample via interaction with metastable species.

2. Background of the Invention

Over the last decade, mass spectrometry has played an increasingly important role in the identification and characterization of biochemical compounds in research laboratories and various industries. The speed, specificity, and sensitivity of mass spectrometry make spectrometers especially attractive for rapid identification and characterization of biochemical compounds. Mass spectrometric configurations can be distinguished by the methods and techniques utilized for ionization and separation of the analyte molecules. One common method for ionizing biomolecules and organic compounds is electrospray ionization (ESI) whereby ions are ionized at atmospheric pressure outside the mass spectrometer via charging, dispersing and evaporating of small droplets. These ions are introduced into the vacuum of a mass spectrometer via an atmospheric pressure interface. Matrix-assisted laser desorption/ionization (ALDI) is another widely used method for ionization of larger biomolecules. In this technique, analytes are mixed with a matrix which absorbs laser irradiation and facilitates ionization. By using pulsed lasers for one-step desorption and ionization, MALDI has application under both reduced pressure and atmospheric pressure conditions.

Despite its extensive use in various applications, the mechanism of ion formation in the MALDI process has not yet been fully understood. It has been generally accepted that the matrix molecules go through a rapid phase change from the solid into the gas phase after absorption of laser radiation. The sublimated matrix molecules may form a dense multiphase gas plume embedding the analyte molecules. Ionization processes occurring during matrix-assisted laser desorption/ionization can be roughly divided into primary ionization in solid clusters and secondary ion-molecule charge- and proton-transfer reactions in the desorbed plume. Recent work (Karas et al., *J Mass Spectrom.* 35 (2000), the entire contents of which are incorporated herein by reference, suggests that primary ionization is the statistical occurrence of clusters with a deficit/excess of anions or cations. Highly charged positive ions cannot survive in the dense plume formed by the laser pulse as the ions undergo charge reduction to charge states 1 and 0, respectively, being neutralized in secondary reactions or in collisions with electrons. Electrons present in this process can be formed by a photoelectric effect on the metal/organic matrix interface, as described in Frankevich et al., *Int. J. Mass Spectrom.* 220, 11 (2002), the entire contents of which are incorporated herein by reference.

Hence, neutralization can be a prominent process and the singly-charged ions finally observed may be considered the "lucky survivors." Experimental measurements of the ion to neutral ratio formed in MALDI process has been reported as low as $10^{-4}$-$10^{-7}$. As a result, more than 99.99% of analyte molecules are present in the gas phase as neutrals and therefore would not contribute to the ion signal.

Franzen et al., U.S. Pat. No. 5,663,561, the entire contents of which are incorporated herein by reference) address a low ionization of the MALDI process by using a laser to desorb the matrix/sample mixture in an atmospheric pressure region and thereafter separate reagent ions from a corona discharge to subsequently chemically ionize neutral sample molecules. Coon et al., U.S. Pat. No. 6,838,663, the entire contents of which are incorporated herein by reference, describe desorbing neutral molecules by laser irradiation from a wide group of supporting structures including: polyacrylamide gel, a thin-layer chromatography plate, a biological tissue, an agarose gel, paper, a fabric, a polymer, plastic, geological material, soil, biological solution, blood plasma and others. The reagent ions were described therein as being generated by corona discharge and mixed with neutral sample molecules at atmospheric pressure. Thomson et al., U.S. Patent Application 2003/0111600 A1, the entire contents of which are incorporated herein by reference, describe vaporization of sample molecules and mixing of the vaporized molecules into a corona discharge to generate ions at sub-atmospheric pressure. The drawback of such arrangements is the necessity of creating a corona discharge of large concentrations of reagent ions. These ions from the corona discharge can charge the surfaces of atmospheric pressure interfaces and ion optics, thus reducing the transmission of analyte ions, usually present in small quantities.

An atmospheric pressure ionization source using metastable atom bombardment is described in Cody, et al., *Anal. Chem.* 2005, 77: 2297-2302, the entire contents of which are incorporated herein by reference. Cody et al., U.S. Pat. Appl. Publ. No. 2005/0056775, the entire contents of which are incorporated herein by reference, provide further details of an atmospheric pressure ionization source using metastable atom bombardment. Ionization of small inorganic molecules at reduced pressures was described for example, in Bertrand et al. U.S. Pat. No. 6,124,675, the entire contents of which are incorporated herein by reference, and in Lewis, et al., *Anal. Chem.* 2003, 75: 1983-1996, the entire contents of which are incorporated herein by reference. As disclosed in U.S. Pat. No. 6,124,675, a beam of metastable atoms can be generated from a source of rare gas. The rare gas is typically introduced into a chamber having a pressure gradient from its entry to an exit. By applying electrical energy to a cathode and anode, an electric discharge can be generated between the cathode and the anode, thereby extending through the aperture or nozzle into the chamber. The discharge in turn energizes the atoms of the rare gas into a mixture of ions/electrons and metastable atoms in which the electrons of these atoms can be raised to higher energy levels. The stream of metastable atoms, ionized atoms and electrons can then pass through a charged deflector, which removes some of the ions/electrons from the stream of particles. Since the metastable atoms are not charged, the forces applied on the ions and electrons tend to force these particles towards a longitudinal axis extending between the cathode and anode while metastable species are not affected.

In these techniques, ionization of small inorganic molecules in the gas phase has been accomplished by the use of metastable atom bombardment, in which a neutral metastable species is used to bombard the sample molecules. A reaction system (which produces a beam of metastable atoms) includes a reaction vessel having a source of rare gas at one end of the vessel, a cathode positioned inside the vessel, and a small sonic nozzle placed at the other end of the vessel. Outside the vessel, a generally cone shaped anode (referred to as a "skimmer") includes an aperture at the apex of the cone. Behind the skimmer, a set of plates serves as a deflector. In operation, the gas is detected at one end of the vessel and passes through the nozzle at the opposite end. The atoms of gas, which are injected through the discharge, are energized to a metastable state, with some of the gas atoms being energized to the point of ionization, thus releasing free ions and electrons into the metastable gas stream. The metastable gas, the free ions and electrons then pass through the aperture in the apex of the skimmer into a set of charged deflector plates. Free ions/electrons are attracted to the deflector plates, leaving the relatively charge free, metastable gas particles to pass through the deflector plates and bombard the sample molecules.

SUMMARY OF THE INVENTION

One object of at least certain embodiments of the present invention is to provide an apparatus for ionization of analytes via interaction with metastable species (atoms or molecules).

Another object of certain embodiments of the present invention is to provide an apparatus for ionization of non-volatile or low-volatile analytes via interaction with metastable species (atoms or molecules).

Another object of certain embodiments of the present invention is to provide an interaction region for interaction of metastable species with analyte molecules to be analyzed.

Yet another object of certain embodiments of the present invention is to provide an interaction region for interaction of metastable species with analyte molecules produced from laser desorption events.

Still another object of certain embodiments of the present invention is to provide an interaction region for interaction of metastable species with analyte molecules produced from matrix-assisted laser desorption/ionization.

Various of these and other objects are provided for in embodiments of the present invention by an apparatus for analyzing a sample material that includes a mechanism configured to desorb molecules from the sample material, a metastable generator separate from the desorption mechanism and configured to generate a metastable species, and an interaction region configured for metastable species ionization of the desorbed molecules so as to produce gas-phase ions of the sample material.

It is to be understood that both the foregoing general description of the invention and the following detailed description are exemplary, but are not restrictive of the invention.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
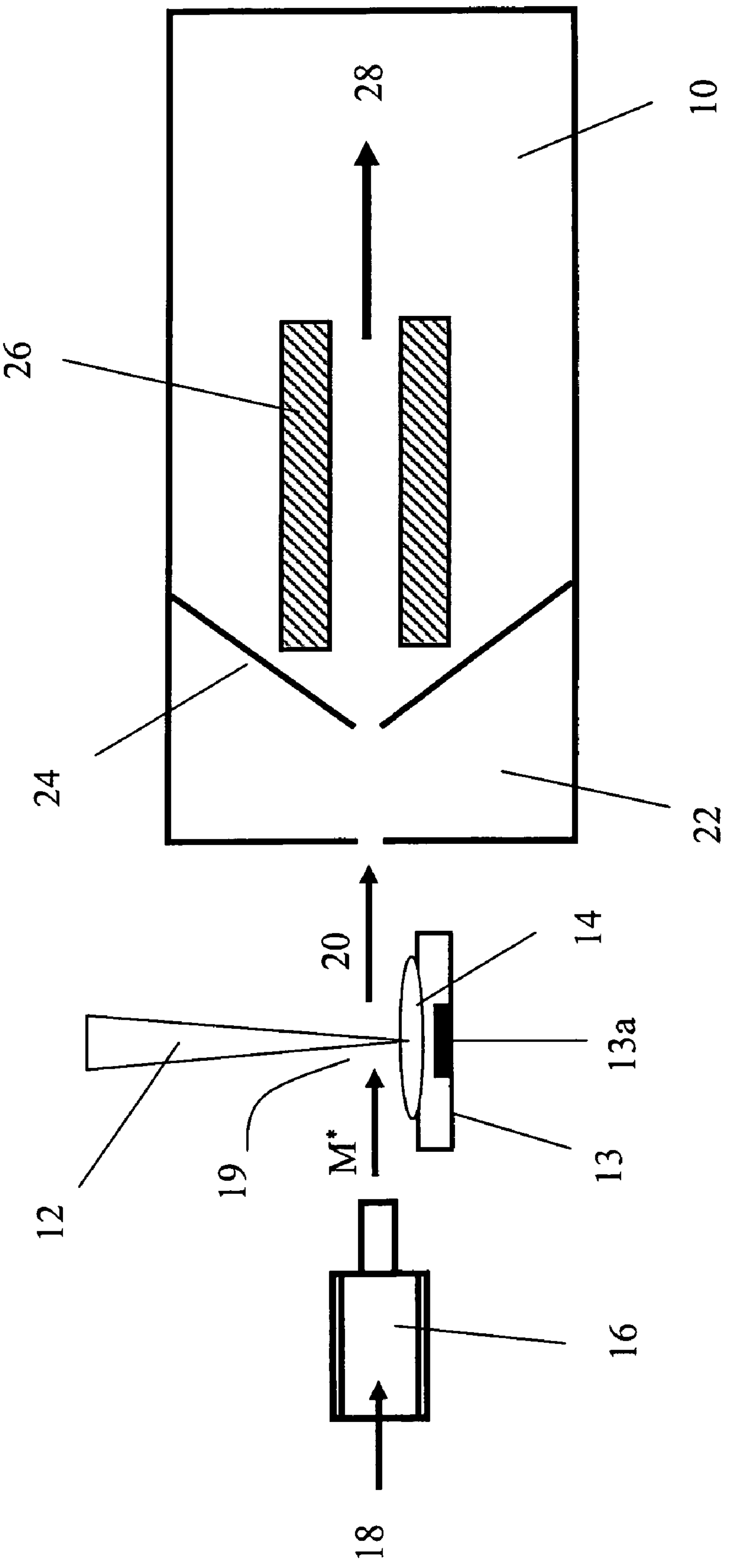
FIG. 1 is a schematic of a mass spectrometer with atmospheric pressure ionization source according to an embodiment of the present invention.

Referring now to the drawings, wherein like reference numerals designate identical, or corresponding parts throughout the several views, and more particularly to FIG. 1, which is a schematic of a mass spectrometer 10 according to an embodiment of the present invention. A laser beam 12 can be focused on the sample 14 to vaporize analyte molecules which interact with metastable species M* produced from a metastable species generator 16. A rare gas or any inert gas 18, such as nitrogen, can be supplied to the metastable species generator 16 to create a metastable species (atoms or molecules in excited electronic or vibronic states) which interact with desorbed neutrals from sample 14 in region 19 at substantially atmospheric pressures (e.g., from 500-1000 Torr, and more preferably between 700 and 800 Torr).

The laser beam 12 can preferably desorb analyte from the sample 14, which is subsequently being ionized via interaction with metastable species to provide a pulsed source of ions for introduction into mass spectrometer 10 such as for example into an ion trap mass spectrometer. In this embodiment of the present invention, the laser beam 12 and the sample 14 constitute a desorption mechanism separate from the metastable species generator 16 (i.e., the metastable species are not used to desorb material from the sample 14). As such, control of delivery of analyte from the sample 14 into the gas phase can be performed with known desorption processes such as laser desorption techniques, including matrix-assisted laser desorption/ionization. As such, metastable flux from the metastable species generator 16 can be directed to gas-phase ionization and not lost to surface deactivation on for example the sample surface or other surfaces nearby. Laser desorption permits evaporation non-volatile or low-volatile analytes which include, but are not limited to, large organic molecules and biomolecules.

The produced ions 20 can be collected by an atmospheric pressure interface 22, which can be pumped to a pressure below atmospheric pressures. The resulting sample ions under this configuration can be directed through an orifice in a skimmer cone 24, into a region of reduced pressure (10 mTorr-1 Torr) region which can contain a multipolar ion guide 26. The multipolar ion guide 26 (preferably an RF guide) can capture and transmit the sample ions into a down stream mass analyzer 28.

In one embodiment of the present invention, the sample support plate can include a heater 13$a$ (e.g., a conductive filament or another heatable element) upon which the sample 14 is deposited. A current is then pulsed through the filament causing it to heat rapidly ($10^{-6}$-1 s). The current is preferably short in duration but high in intensity. At least part of the typically solid or liquid sample can thereby be quickly vaporized. After which, the sample molecules can be ionized by the metastable species flux from the metastable species generator 16. Such a technique can also provide a desorption mechanism to pulse desorb analyte molecules from the sample 14.

Figure 2:
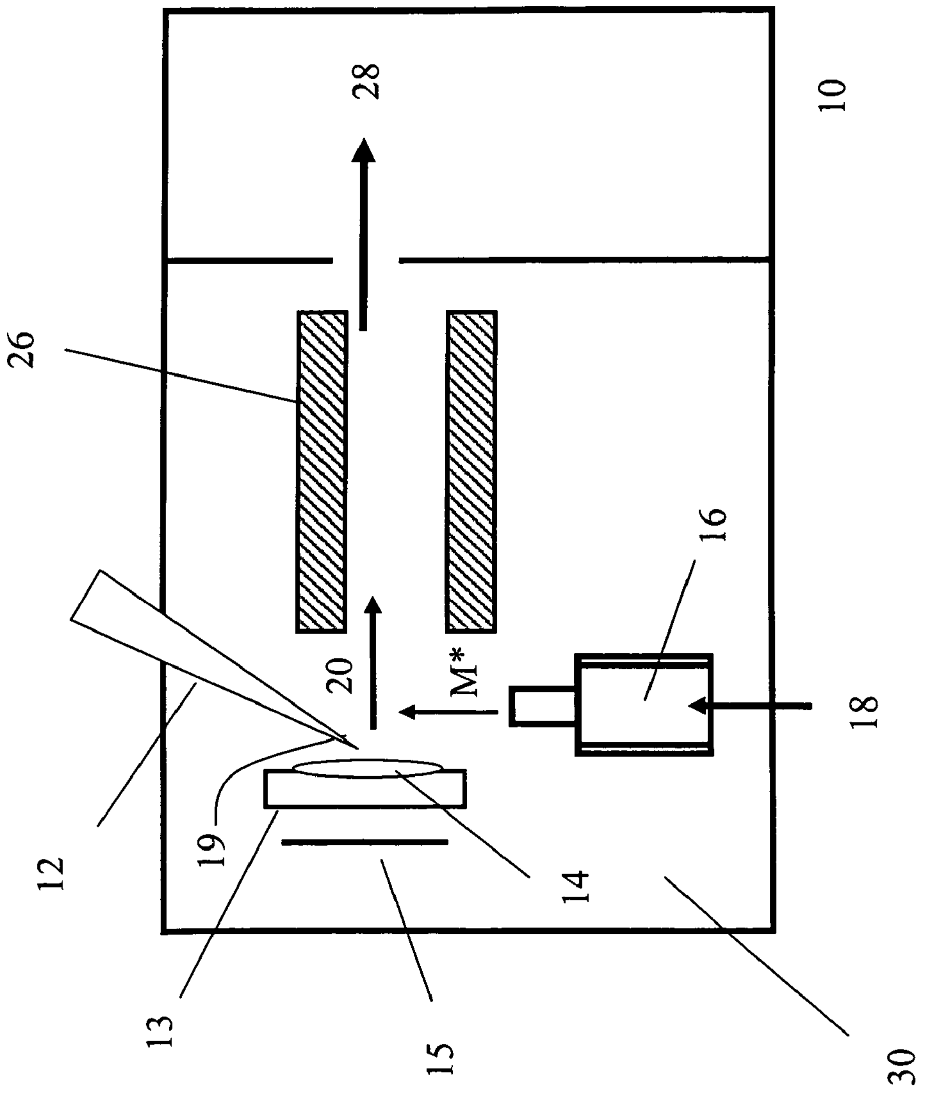
FIG. 2 is a schematic illustration showing one embodiment of the present invention where metastable species interact with desorbed sample molecules at reduced pressures.

In another embodiment of the present invention, as illustrated in FIG. 2, there is no atmospheric pressure interface, and therefore sample ion losses on an entrance aperture and the orifice in the skimmer cone can be reduced or avoided. The pressure in the chamber 30 (preferably 10-100 mTorr) can be determined by the balance of gas flow from the metastable species generator 16 and by the pumping speed of a pump (not shown) attached to the chamber 30. In this embodiment, the laser beam 12 can preferably desorb analyte from the sample 14, which can subsequently be ionized via interaction with metastable species to provide a pulsed source of ions for introduction into the mass spectrometer 10 such as for example into an ion trap mass spectrometer. The heater configuration (described above) can also be used with or without the laser beam 12 to desorb analyte from the sample 14 into the gas phase. A DC electric field can be provided between the sample support plate 13 and the multipolar RF ion guide 26 (or alternatively any RF ion guide) to drive sample ions towards a downstream mass spectrometer 28.

The electric field can be adjusted to optimize the sample signal in the downstream mass spectrometer 28. Such an adjustment procedure is known in the art. If the sample support plate 13 is not (or poorly) electrically conductive, an electric field can be established by an additional electrode 15 located between the sample support plate 13 and an end of the vacuum chamber 30. Other electrodes (not shown) could also be used to optimize the ion flux into the multipolar RF ion guide 26. These electrodes could be placed near the sample 14, as is familiar to those skilled in the art. In this embodiment, the concentration of metastable species in the interaction region 19 may be limited due to the vacuum requirements.

Figure 3:
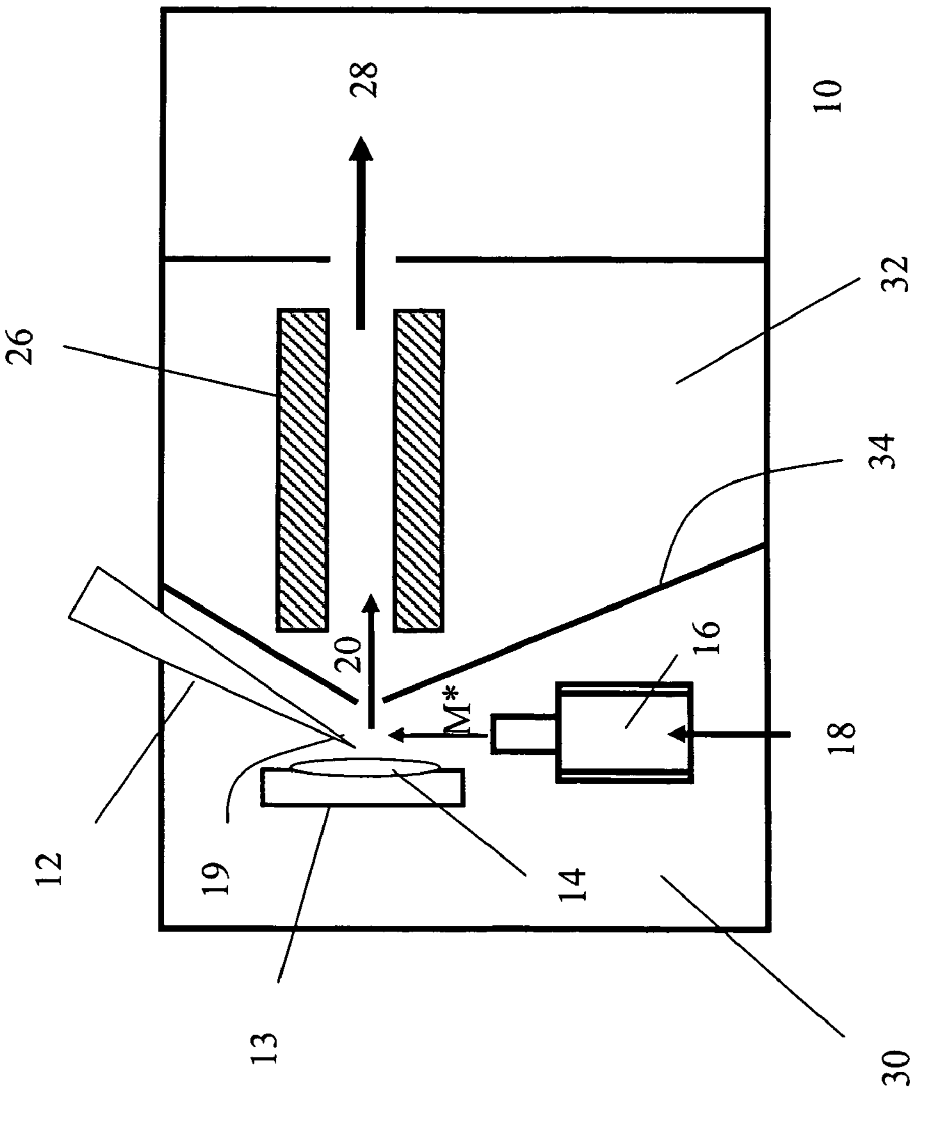
FIG. 3 is a schematic illustration showing another embodiment of the present invention where metastable species interact with desorbed sample molecules at reduced pressures.

Another embodiment of the present invention is shown in FIG. 3. In this configuration the sample 14 and interaction region 19 are separated from the ion guide section 26 by a skimmer cone 34. The pressure in chamber 30 can be maintained in the range of 100 mTorr-10 Torr, thus allowing for a substantial increase in the concentration of metastable species in interaction region 19. Other electrodes (not shown) can also be used to optimize the ion flux into the ion guide 26 (preferably a multipolar RF guide). Differential pumping of chambers 30 and 32 permits maintenance of the pressure in the ion guide 26 in the range 10-100 mTorr, thus providing transmission of sample ions 20 into the mass analyzer 28. In this embodiment, the laser beam 12 can preferably desorb analyte molecules from the sample 14, which can subsequently be ionized via interaction with metastable species to provide a pulsed source of ions for introduction into mass spectrometer 10 such as for example into a time-of-flight mass spectrometer. The heater configuration (described above) can also be used with or without the laser beam 12 to desorb analyte from the sample 14 into the gas phase.

Although the embodiments described herein can employ multipolar RF ions guides (e.g., RF quadrupoles, RF hexapoles, RF octapoles and the like), other RF ion guide devices, such as RF ring guides or tapered RF ring guides (i.e., ion funnels) can also be employed. The purpose of these devices is to provide ion confinement and collisional focusing, and can provide higher sensitivity by way of improved ion transmission efficiency. Other ion focusing or transmission devices may be used to similar benefit.

Figure 4:
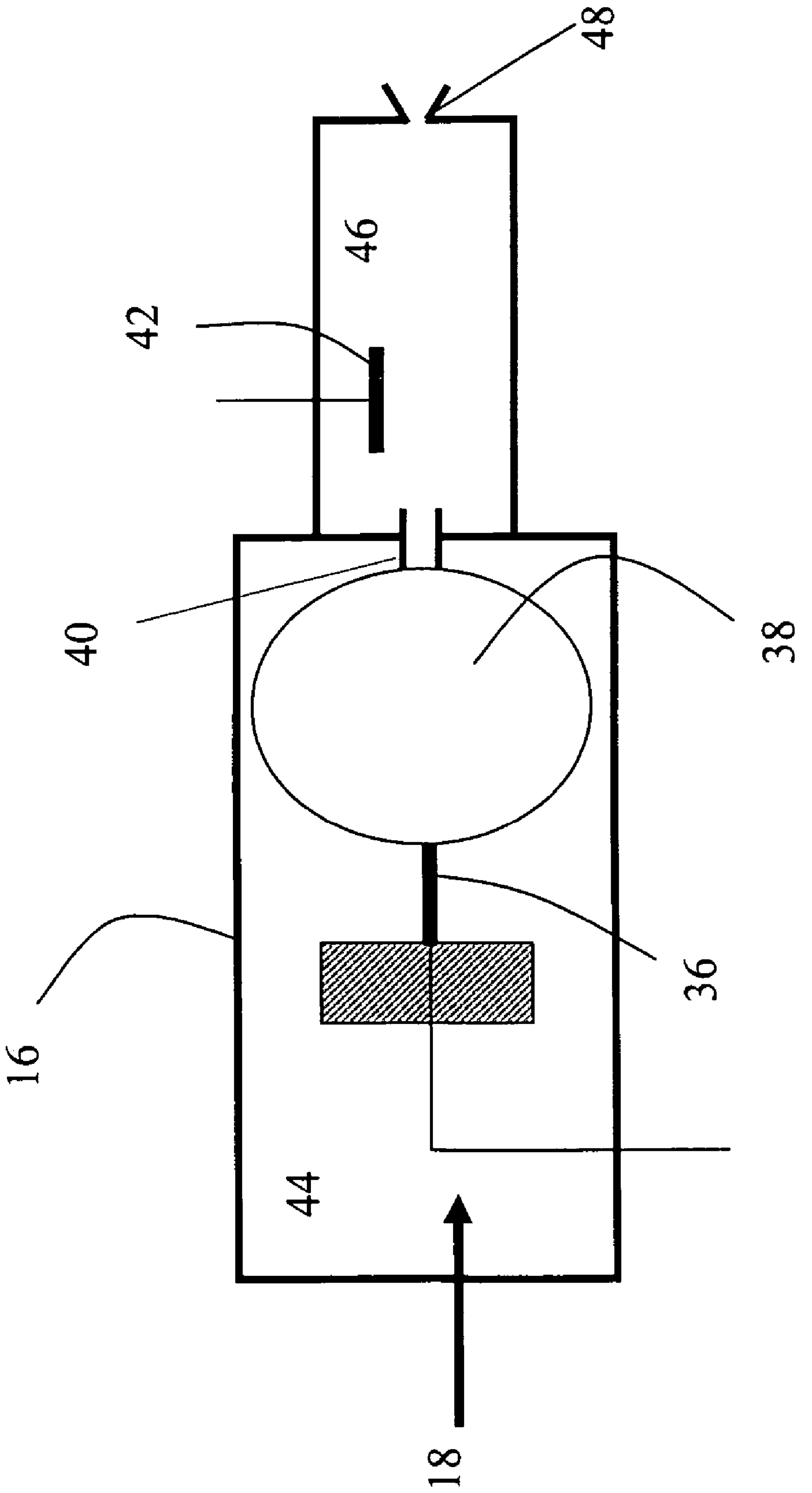
FIG. 4 is a schematic illustration of a metastable species source according to one embodiment of the present invention.

As shown in FIG. 4, in another embodiment of the present invention, the metastable species source 16 can include, for example, a corona discharge chamber 44 operated at pressures near or above atmospheric pressure (e.g., from 500-1000 Torr, and more preferably between 700 and 800 Torr). A second chamber 46 is separated from the corona discharge chamber 44 by an aperture 40. According to this embodiment of the present invention, an exit nozzle 48 can be located between the metastable species source 16 and the interaction region 19. Electrodes 36 and 42 can drive the glow discharge. As shown, the electrode 42 is preferably, but not necessarily, placed off axis to collect charged species from the metastable flux.

As shown in FIG. 4, the metastable species generator 16 used in FIGS. 1-3 can include an electrical discharge region 38 disposed apart from the interaction region 19. As shown in FIG. 4, an electrically biasable electrode (e.g., electrode 42) can be disposed in a vicinity of the electrical discharge region 38 and can collect charged species from the electrical discharge region 38 so as to reduce transport of the charged species from the exit nozzle 48 into the interaction region.

For configurations depicted on FIGS. 2-3, the metastable species source 16 can include, for example, a glow discharge chamber 44 operated at reduced pressures of 10-100 Torr. In this configuration, the second chamber 46 is separated from the glow discharge chamber 44 by the aperture 40 and is differentially pumped, for example to 1 Torr. According to an embodiment of the present invention, the exit nozzle 48 can be located between the metastable species source 16 and the ionization volume. The comparatively high vacuum pressures of 100 mTorr and 10 Torr impose less restrictions on nozzle diameter 48 that separate the gas discharge volume from the ionization volume. As an example, nozzle diameters of 0.1 to 1 mm can be used for nozzle 48.

Other types of electrical discharges can be used, such as described, for example, in Yu. P. Raizer, (Gas Discharge Physics, Springer, Berlin, 1991), the entire contents of which are incorporated herein by reference. These discharges can include for example pulsed and non-pulsed electrical discharges. These discharges can include one of a microwave, an inductively coupled, a capacitively couple, a glow, or a corona discharge. Further, the metastable generator 16 can be configured to control a duration of metastable species injection into the interaction region 19. The metastable generator 16 can be configured to control the duration of metastable species injection into the interaction region 19 by controlling a duration of an electrical discharge producing the metastable species.

Furthermore, the present invention is not necessarily limited to pulse desorption techniques. One desorption technique of the present invention could continuously laser irradiate a sample 14 and pulse the metastable generator 16 (as described for example in related application U.S. Ser. No. 11/126,215 entitled “METHOD OF ION FRAGMENTATION IN A TANDEM MASS SPECTROMETER” filed May 11, 2005,) to produce a stream of pulsed metastable species for interaction with the analyte molecules desorbed from the sample. In addition or alternatively, both the desorption process and the metastable species generation could be continuous, Indeed, timed entry of pulsed ions is not required in the present invention. For example, in orthogonal acceleration time-of-flight mass spectrometer (which is typically used with atmospheric or elevated pressure sources) the ion beam continuously enters an acceleration region. Then, an extraction pulse is applied which starts time-of-flight sequence. During the time when ions fly to the detector, the beam is not used. Similar situations occur in ion traps—during mass analysis (up to 1 s) the trap is closed and the ion beam is not used.

Numerous modifications and variations on the present invention are possible in light of the above teachings. It is, therefore, to be understood that within the scope of the accompanying claims, the invention may be practiced otherwise than as specifically described herein.

The invention claimed is:

1. An apparatus for analyzing a sample material, comprising:

a desorption mechanism configured to desorb molecules from the sample material;

a metastable generator separate from the desorption mechanism and configured to generate a metastable species; and an interaction region configured for metastable species ionization of the desorbed molecules so as to produce gas-phase ions of the sample material.

2. The apparatus of claim 1, further comprising:

a mass analyzer configured to detect a mass of the gas-phase ions.

3. The apparatus of claim 2, wherein the mass analyzer comprises at least one of a three-dimensional ion trap, a linear ion trap, a quadrupole mass spectrometer, a Fourier transform ICR mass spectrometer, a magnetic sector mass spectrometer, a time-of-flight mass spectrometer, ion mobility mass spectrometer, or a tandem mass spectrometer.

4. The apparatus of claim 1, wherein the desorption mechanism comprises a laser beam source.

5. The apparatus of claim 1, wherein the desorption mechanism is configured to desorb said molecules at or near atmospheric pressure.

6. The apparatus of claim 1, wherein the desorption mechanism is configured to desorb said molecules at intermediate vacuum of 100 Torr to $1\times10^{-3}$ Torr.

7. The apparatus of claim 1, wherein the desorption mechanism is configured to desorb said molecules at pressures below $1\times10^{-3}$ Torr.

8. The apparatus of claim 1, wherein the sample material comprises a matrix for absorption of an incident laser beam.

9. The apparatus of claim 1, wherein the metastable generator comprises:

an electrical discharge for generation of atomic or molecular metastable species.

10. The apparatus of claim 9, wherein the electrical discharge comprises:

at least one of a microwave discharge, an inductively-coupled discharge, capacitively-coupled discharge, a glow discharge, or a corona discharge.

11. The apparatus of claim 9, wherein the electrical discharge comprises:

a pulsed electrical discharge.

12. The apparatus of claim 9, wherein the electrical discharge is configured to include a noble gas.

13. The apparatus of claim 9, wherein the electrical discharge is configured to include inorganic molecules.

14. The apparatus of claim 1, wherein the metastable generator comprises an electrical discharge at 10 mTorr to 100 mTorr.

15. The apparatus of claim 1, wherein the metastable generator comprises an electrical discharge at 100 mTorr to 1 Torr.

16. The apparatus of claim 1, wherein the metastable generator comprises an electrical discharge at 1 Torr to 10 Torr.

17. The apparatus of claim 1, wherein the metastable generator comprises an electrical discharge at 10 Torr to 100 Torr.

18. The apparatus of claim 1, wherein the metastable generator comprises an electrical discharge at 100 Torr to 1000 Torr.

19. The apparatus of claim 1, wherein the metastable generator is configured to control a duration of metastable species injection into said interaction region.

20. The apparatus of claim 1, wherein the metastable generator is configured to control a duration of metastable species injection into said interaction region by controlling a duration of an electrical discharge producing the metastable species.

21. The apparatus of claim 1, wherein the metastable generator comprises an electrical discharge region disposed apart from the interaction region.

22. The apparatus of claim 21, further comprising:

an electrically biasable electrode configured to collect charged species from the electrical discharge region so as to reduce transport of the charged species into the interaction region.

23. The apparatus of claim 22, wherein the electrically biasable electrode is disposed off an axis between the electrical discharge region and the interaction region.

24. The apparatus of claim 4, wherein the laser beam source is configured to generate a pulsed laser beam.

25. The apparatus of claim 1, wherein the metastable generator is configured to heat a flow of metastable species to temperatures of 50-500° C.

26. An apparatus for analyzing a sample material, comprising:

a desorption mechanism configured to laser desorb molecules from a sample material;

a metastable generator configured to generate a metastable species; and an interaction region configured for metastable species ionization of the desorbed molecules so as to produce gas-phase ions of the sample material.

27. An apparatus for analyzing a sample material, comprising:

a desorption mechanism configured to desorb molecules from a sample material;

a metastable generator configured to generate a pulse of metastable species; and an interaction region configured for metastable species ionization of the desorbed molecules so as to produce gas-phase ions of the sample material.

* * * * *